(12) United States Patent
Guiet et al.

(10) Patent No.: US 7,530,215 B2
(45) Date of Patent: May 12, 2009

(54) CONTROL ARRANGEMENT

(75) Inventors: Lionel Guiet, Gray (FR); Stéphane Biziorek, Champlitte (FR)

(73) Assignee: Deere & Company, Moline, IL (US)

( * ) Notice: Subject to any disclaimer, the term of this patent is extended or adjusted under 35 U.S.C. 154(b) by 126 days.

(21) Appl. No.: 11/682,336

(22) Filed: Mar. 6, 2007

(65) Prior Publication Data
US 2007/0221073 A1     Sep. 27, 2007

(30) Foreign Application Priority Data
Mar. 10, 2006   (DE) .................. 10 2006 011 135

(51) Int. Cl.
*B30B 5/06* (2006.01)
*A01F 15/08* (2006.01)

(52) U.S. Cl. .......................... 56/344; 100/88

(58) Field of Classification Search ............... 100/43, 100/45, 48, 87–89, 100; 56/341, 344, 432; 177/136; 53/211, 430, 508, 587
See application file for complete search history.

(56) References Cited

U.S. PATENT DOCUMENTS 6,378,276 B1 * 4/2002 Dorge et al. ............... 53/502
6,389,785 B1 * 5/2002 Diekhans et al. ........... 56/10.2 F
6,457,295 B1 * 10/2002 Arnold ...................... 53/211
7,091,425 B2 * 8/2006 Viaud et al. ................ 177/136
7,353,753 B2 * 4/2008 Viaud ........................ 100/88

FOREIGN PATENT DOCUMENTS

| DE | 199 06 611 | 8/2000 |
|---|---|---|
| DE | 199 10 555 | 9/2000 |
| DE | 102 50 694 | 2/2004 |
| DE | 102 41 215 | 3/2004 |
| EP | 1 266 562 | 12/2002 |
| EP | 1 512 320 | 3/2005 |

OTHER PUBLICATIONS

German Search Report, Jun. 25, 2007, 3 Pages.

* cited by examiner

*Primary Examiner*—Robert E Pezzuto

(57) ABSTRACT

A rotobaler is provided with an inclination sensor that recognizes the inclination of the rotobaler, to the side as well as in the longitudinal direction. The inclination sensor generates a signal that is processed by a computer that controls a display arrangement in order to indicate whether a bale that is to be unloaded from the rotobaler can be ejected from the rotobaler, as presently positioned. If the inclination is such that a safe ejection of the bale is not possible, the computer sends out a signal that locks an outlet arrangement for the bale, or that steers the rotobaler in such a way that the bale is deposited with its longitudinal axis parallel to the inclination of the slope.

4 Claims, 1 Drawing Sheet

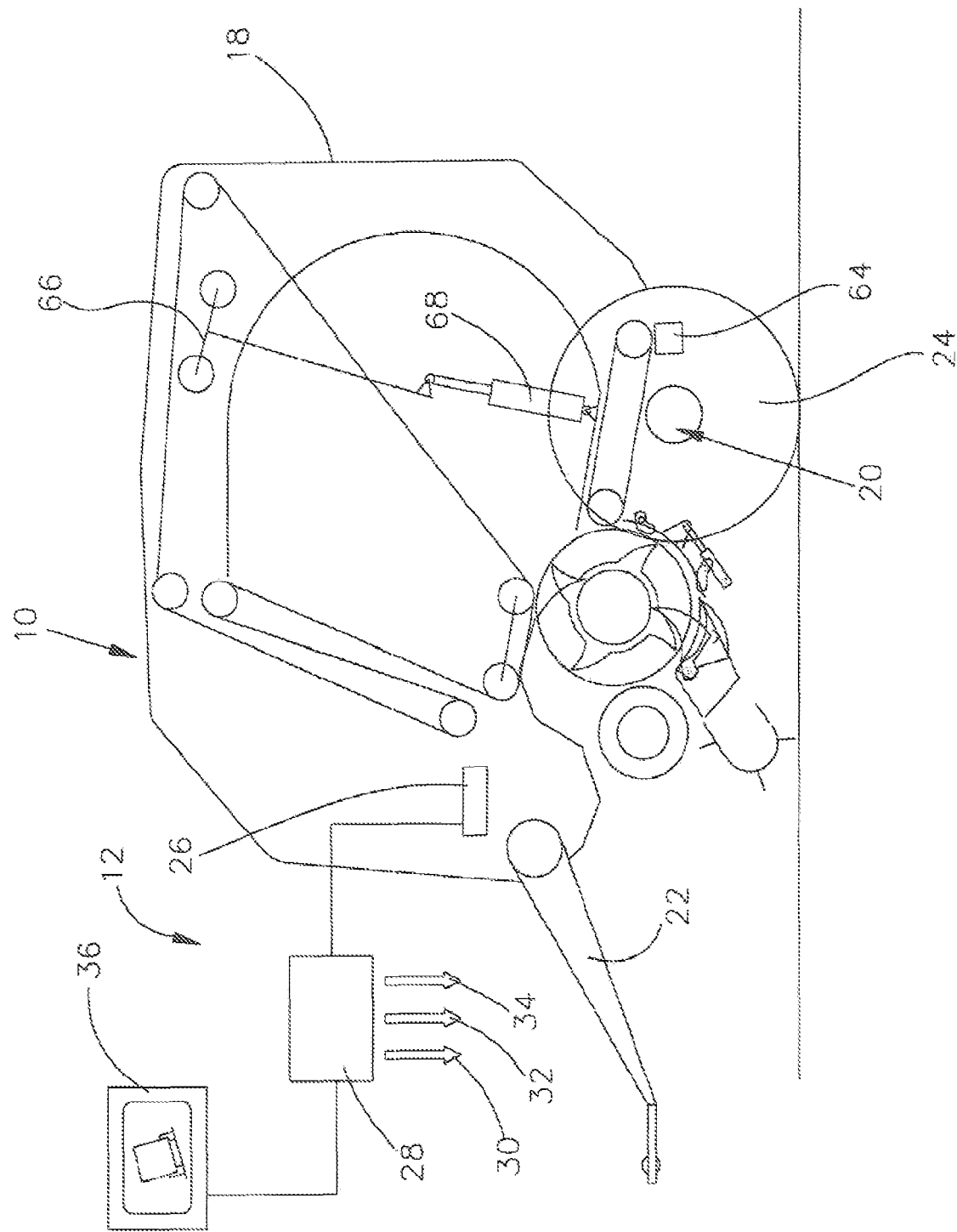

CONTROL ARRANGEMENT

FIELD OF THE INVENTION

The invention concerns a control arrangement of a vehicle that deposits circular cylindrical bales on the ground, with an inclination sensor, that forms a signal from the inclination of the vehicle, as well as a rotobaler or a bale wrapping arrangement.

BACKGROUND OF THE INVENTION

DE 199 10 555 A1 discloses a rotobaler with a deposit arrangement configured as a level for a cylindrical bale. An inclination sensor is associated with this deposit arrangement, it corrects result of the weighing that may have been falsified due to the inclination.

EP 1 512 320 A2 discloses a rotobaler that deposits a cylindrical bale on the ground, where the exit of the bale is limited by a double-wing door and its position is corrected, if necessary, so that it cannot roll down any slope.

The problem underlying the invention is seen in the fact that the deposit of a cylindrical bale on a slope is still, as ever, a serious matter, and avoiding the problem succeeds only with very highly trained operators, or that a bale lying on the ground must be slid directly to a better position and can thereby be damaged.

SUMMARY OF THE INVENTION

According to the present invention, there is provided an improved control arrangement for controlling the position of a bale ejected on sloping ground.

An object of the invention is to provide a control arrangement associated with a vehicle that deposits cylindrical bales on the ground, with the control arrangement including an inclination sensor that generates a signal representing the inclination of the vehicle which is used for the positioning of the vehicle or for the operation of an actuating arrangement associated with an outlet arrangement for the bale.

In this way the result is that the bale is either deposited in such a way that its axis of rotation or its longitudinal axis follows the inclination of the slope directly or, for example an unloading of the bale is completely prevented, this is particularly important with non-stop implements. Unlike in the state of the art, a bale of as much as a ton in weight need not be turned on the ground, which anyway is very difficult with a relatively light baler. Since the bale is not slid along the ground, its possible wrapping (net or foil) cannot be damaged. Neither is it possible that the bale can roll down a slope into the back side of the baler before its position is corrected. The inclination sensor is preferably configured in such a way that it can determine the inclination of the slope in the direction of operation as well as transverse thereto; it may be configured mechanically, hydraulically or electrically, for example, as a mercury level. Obviously, several simple inclination sensors could also be provided, each of which is acting in only one direction, that generate a signal together. The inclination sensor may be equipped with a damping device, that avoids undesirable excursions due to irregularities in the ground. The signal can be utilized in a multitude of ways, beginning with an acoustic or visual guide signal to an operator up to a fully automatic steering of the vehicle into a safe position on the slope. The vehicle may be self-propelled or a towed vehicle, for example a baler, a bale wrapping vehicle etc. Alternatively, there is the possibility, for example, of avoiding the unloading of the bale from the baling chamber, if it can be seen that this could lead to damage or interruptions in the operation. A semi-automatic or fully automatic deposit of the bale into a safe position is made possible if the vehicle itself and/or a deposit arrangement attached to it can be repositioned by means of actuating arrangements. The position required at any given time, for example, the angle of inclination between a rotobaler and a bale wrapping arrangement or between a towing vehicle and the rotobaler can be varied in such a way that finally the bale can be deposited safely. By the same token, a deposit arrangement can be oriented in such a way that either the rotational axis of the bale follows the inclination of the slope or that the bale is deposited on the ground with its end face downward. The actuating arrangement is preferably configured as an electric or hydraulic motor operating as a linear motor.

The use of an acoustic or visual display arrangement, that is comparable to a parking assistance device, can provide adequate guidance to an operator, for example, for the orientation of the vehicle on a slope. But it can also transmit a warning signal from which an operator can recognize that no bale is permitted to be unloaded and that this restriction applies as long as the signal is sounded. Various degrees of alarm can be produced that depend, for example, on the particular risks that may exist in the surroundings of the location of the deposit, such as a road. The display arrangement may include a pointer, indicator lamps or the like or even a monitor.

The inclination of the vehicle or of the ground on which it stands can be determined by means of G.P.S. or another system supported by satellites, so that an inclination sensor is available in the receiver of such a system that receives the G.P.S. data and transmits them to the computer. This can lead to cost savings and make a signal available earlier.

The incorporation of the signal into the control of the operation of the vehicle may result, for example, in the interruption of any further supply of crop, if a determination is made that a bale cannot be unloaded and hence the baling chamber cannot be supplied with any more crop.

Instead of detecting the inclination by means of a pendulum or like, this can also be performed by detecting a movement of the vehicle up-slope or down-slope on the towbar or the attachment coupling; or it can be detected at the wheels or the axle that a push to the side exists, that is down-slope. If necessary, the tilting movement of the frame of the vehicle relative to a tandem axle can also be used to detect whether it is operated up hill or down hill.

If a computer is used which forms an actuating signal of the repositioning arrangement from the signal, there is the possibility of processing this signal, for example, to amplify it, to delay it, to vary it as a function of other values etc. The computer may be an on-board computer on a towing vehicle or on the vehicle itself.

In addition to detecting the safe deposit of the bale, the control arrangement can also be used to correct a value for the weight of the bale as a function of the inclination.

Rotobalers and bale wrapping arrangements are frequently applied on slopes and inclined surfaces; in order to increase their performance and in order to possibly apply them to non-stop implements, a control arrangement is applied that was described above.

BRIEF DESCRIPTION OF THE DRAWINGS

The sole FIGURE of the drawing shows an embodiment of the invention on the basis of a vehicle with a control arrangement.

DESCRIPTION OF THE PREFERRED EMBODIMENT

A vehicle 10 shown in the single FIGURE is shown there as a rotobaler that can be attached to a towing vehicle, not shown, that is provided with a control arrangement 12 and that forms a cylindrical bale that can be deposited on the ground by opening an outlet arrangement 66.

In addition to a multitude of components having no significance to the invention, the vehicle 10 is provided with a frame 18, a chassis 20, a towbar 22 and the outlet arrangement 66.

The frame 18 rests on the chassis 20 and carries the towbar 22 at its front.

The chassis 20 is supported on the ground by wheels 24 that follow a slope of the ground that extends transverse to the direction of operation, provided that this exists. Since only one wheel or possibly two wheels 24 exist on each side, the chassis can be pivoted about an imaginary horizontal axis and thereby stand at the slope more or less steeply. The wheels 24, or the chassis 20 as a whole, could be attached so as to be steered relative to the frame 18.

The towbar 22 can pivot about a vertical axis in the connecting region of the towing vehicle and can thereby be oriented so as to be aligned or not aligned with the towing vehicle.

The outlet arrangement 66 is configured as a so-called gate, outlet flap or the like, and can be brought into a raised position in which a bale formed in the vehicle can leave the vehicle 10. For this purpose, an actuating arrangement 68 that can be actuated hydraulically is provided, normally on each side of the vehicle 10.

The control arrangement 12 includes, among other items, an inclination sensor 26, a computer 28, a display arrangement 36 and the actuating arrangement 68, or an associated selector valve, which are connected to each other in a wireless manner or by means of electrical lines. The purpose of the control arrangement 12 is to recognize in which special relationship the vehicle is when it is located on a slope in order to control the vehicle 10 or the outlet arrangement 66 in such a way that the bale is deposited in a situation in which it does not roll down a slope.

The inclination sensor 26 may be configured, for example, as a mercury level and can recognize in which direction the vehicle 10 is inclined relative to an absolute position. The inclination sensor 26 generates a signal, preferably an electronic signal, from which it can be recognized whether the vehicle 10 is inclined in the transverse direction and/or in the longitudinal direction and to what degree it is inclined. A damping device, not shown, will provide the assurance that changes in the position due to uneven ground are not considered. The inclination of the slope could also be derived from other factors, for example, from forces applied to the towbar 22, from side forces on the wheels 24, particularly in the case of a tandem axle and the like.

The computer 28 is configured and attached as an on-board computer to the towing vehicle or as a calculator 28 to the vehicle 10 itself. CAN-bus technique can be used to transmit the signal. The signal of the inclination sensor 26 is processed in the computer 28, that is, for example, it is amplified and linked with other signals, and an output signal is generated based on these signals, for example, for effecting a display on the display arrangement 36, or for effecting actuation of an acoustic alarm device. A different output signal is generated for the change in position of the actuating arrangement 68 through which, for example, electro-hydraulic valves are controlled. The computer 28 can be equipped with an input arrangement, for example, a keyboard, a touch-screen, a voice control and the like, with which the operator can end, utilize or activate and affect the signal processing. The signal generated by the computer 28 is configured in such a way that the actuating arrangement 68 can deposit the bale only if it cannot roll downhill or if the vehicle 10 is in a position that prevents the bale from rolling down hill. The computer 28 can also be connected with a weighing arrangement 64 whose signal is corrected in order to eliminate effects due to the slope of the hill.

The display arrangement 36 may be a simple indicator, a device for the display of the actual condition that could show critical position or a no-critical position of the vehicle 10 or of the outlet arrangement 66, a graphical display that provides steering instructions etc; it is preferably located on the towing vehicle and is connected with the computer 28.

The actuating arrangement 68 is configured as a hydraulic motor or an electric motor and is repositioned by external forces in one or in both directions, depending on the requirements. The actuating arrangement 68 can also be equipped with an internal positioning sensor, as a so-called active cylinder.

The bale is configured as a cylinder and is provided with an end face and a circumferential surface; the diameter may be as great as 1.8 to 2 meters. The bale can be deposited on the ground directly after leaving the vehicle 10, or it can be delivered to a foil wrapping arrangement, coupled or attached to the vehicle, where it is wrapped for the formation of silage. If the foil wrapping arrangement is coupled to the vehicle, a further actuating arrangement, not shown, can be provided that affects the angle between the vehicle 10, for example, the rotobaler, and the foil wrapping arrangement that is then supported on its own wheels and can be steered.

Obviously, lines, sources of current etc. are provided in the control arrangement itself but are neither described nor characterized, since these are included automatically.

The operation according to the invention follows form the above description.

During operation, the inclination sensor 26 generates a signal that is transmitted to the computer 28 and from which the latter recognizes in which position the vehicle 10 is located relative to a line through the center of the earth. For example, the vehicle 10 is inclined to the side if an axis of rotation extending through the wheels 24 of the chassis 20 follows the inclination or slope or is tilted in the forward direction or in the backward direction when the vehicle 10 is operated up a slope or down a slope. Obviously, the vehicle 10 can also be inclined in both directions. With each inclination, the danger exists that the bale can roll down the slope after it is deposited on the ground.

The computer 28 generates a signal that:
a) provides a display on the display arrangement 36 and/or
b) affects the actuating arrangement 68.

In the case of a display on the display arrangement 36, either only a warning indication is issued or a repositioning of the vehicle 10 is demanded, that lies outside the critical region for the deposit of the bale. For this purpose, sounds of different frequencies can be transmitted or represented by means of indicators on the display to show the relationship of the vehicle to the dangerous region and how it can be brought into a safe region.

If the computer 28 is only required to prevent the unloading of a bale from the vehicle 10, then an activation of the actuating arrangement 68 is prevented.

In case that a semi-automatic or a fully automatic control or regulation of the actuating arrangement 68 is to take place, this operates in such a way that an unloading of the bale is prevented as long as it could roll away after leaving the baling chamber, but that the actuating arrangement is automatically activated which circumstances permit an unloading, or that an acoustic or visual notice is given as soon as a safe unloading is possible.

The display arrangement 36 can also be activated in such a way that it instructs an operator to orient the vehicle 10 on a slope manually in such a way that the bale can be unloaded or that the operator reposition an actuating arrangement, not shown, that automatically leads to such a positioning, for which purpose, for example, a jointed towbar or the like could be used.

Having described the preferred embodiment, it will become apparent that various modifications can be made without departing from the scope of the invention as defined in the accompanying claims.

The invention claimed is:

1. In a vehicle having a chamber adapted for carrying a large cylindrical bale having a central axis oriented transversely to a direction of travel of said vehicle, said chamber including an outlet arrangement mounted for selected movement between a closed position preventing a bale contained in said chamber from exiting said chamber, and an open position allowing a bale contained in said chamber to be deposited on the ground, a control arrangement including an actuating arrangement operatively associated with said outlet arrangement for moving said outlet arrangement between said closed and open positions, the improvement comprising: said control arrangement further including a computer, an inclination sensor that generates an inclination a signal representing the inclination of said vehicle, with said inclination signal being coupled to said computer, said computer being coupled to said actuating arrangement for effecting actuation of said actuating arrangement for moving said outlet arrangement from said closed position to said open position only when said inclination signal indicates that said vehicle is inclined generally parallel to said central axis of a bale to be deposited on the ground.

2. The vehicle, as defined in claim 1, wherein said control arrangement further includes at least one of an acoustic or visual display arrangement that is operated as a function of said inclination signal.

3. The vehicle, as defined in claim 1, wherein said inclination sensor is integrated in a steering system operable for changing a location of said vehicle on said ground in accordance with a sensed inclination so that a more favorable condition exists for depositing a bale from said chamber.

4. The vehicle, as defined in claim 1, and further including a weighing arrangement coupled to said chamber for generating a weight signal representing a weight of a bale contained in the chamber; and said computer being coupled to said weighing arrangement for receiving and correcting said weight signal in accordance with said inclination signal representing an inclination of the vehicle

* * * * *